United States Patent
Lorenz

(10) Patent No.: US 6,698,644 B2
(45) Date of Patent: *Mar. 2, 2004

(54) USE OF SILVER-COPPER-PALLADIUM BRAZING ALLOYS

(75) Inventor: Rainer Lorenz, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 09/994,559

(22) Filed: Nov. 27, 2001

(65) Prior Publication Data

US 2002/0033056 A1 Mar. 21, 2002

Related U.S. Application Data

(63) Continuation of application No. 09/618,068, filed on Jul. 17, 2000, now Pat. No. 6,352,196, which is a continuation of application No. 09/110,606, filed on Jul. 6, 1998, now Pat. No. 6,168,069.
(60) Provisional application No. 60/056,285, filed on Sep. 3, 1997.

(30) Foreign Application Priority Data

Jul. 18, 1997 (EP) .............................. 97112357

(51) Int. Cl.[7] .......................... B21D 39/04; B23R 1/00; B23R 31/02; G01F 1/80
(52) U.S. Cl. ...................... 228/131; 228/121; 228/126; 228/208; 228/262.42; 428/661; 420/602; 73/861.357; 73/861.351; 73/861.354
(58) Field of Search ................................. 228/131, 121, 228/126, 208, 262.42; 428/661; 420/502; 73/861.351–861.357

(56) References Cited

U.S. PATENT DOCUMENTS

| | | | |
|---|---|---|---|
| 3,264,728 A | | 8/1966 | Mabry et al. |
| 3,919,761 A | | 11/1975 | Bomberger, Jr. |
| 3,956,098 A | * | 5/1976 | Welch et al. ............... 540/223 |
| 3,991,929 A | | 11/1976 | Smith |
| 4,011,981 A | | 3/1977 | Danna et al. |
| 4,454,977 A | | 6/1984 | Aldinger et al. |
| 4,585,255 A | * | 4/1986 | Ridenour .................... 285/322 |
| 4,714,189 A | * | 12/1987 | Tovey ........................ 228/122 |
| 4,725,509 A | | 2/1988 | Ryan |

(List continued on next page.)

FOREIGN PATENT DOCUMENTS

| | | |
|---|---|---|
| CA | 1218882 | 10/1987 |
| EP | 0 104 500 | 4/1984 |

OTHER PUBLICATIONS

ASTM International website http://enterprise.astm.org/PAGES/A922.htm, A922–93(2000), Standard Specification for Silicon metal Copyright 2003 ASTM International.*

(List continued on next page.)

*Primary Examiner*—L. Edmondson
(74) *Attorney, Agent, or Firm*—Jones, Tullar & Cooper, P.C.

(57) ABSTRACT

A single-tube Coriolis mass flow sensor includes a stainless steel sleeve having an unplated interior surface and a titanium member having a cylindrical end inserted into the stainless steel sleeve. The exterior surface of the titanium cylindrical end forms a joint with the unplated interior surface of the stainless steel sleeve. The titanium cylindrical end is brazed to the unplated interior surface of the stainless steel sleeve at the joint, and the stainless steel sleeve exerts compressive stress on the titanium cylindrical end at the joint.

41 Claims, 3 Drawing Sheets

U.S. PATENT DOCUMENTS

| | | | |
|---|---|---|---|
| 4,783,997 A | | 11/1988 | Lynnworth |
| 4,793,191 A | | 12/1988 | Flecken et al. |
| 5,129,574 A | | 7/1992 | Tobin |
| 5,159,838 A | * | 11/1992 | Lynnworth .................. 73/644 |
| 5,167,725 A | | 12/1992 | Clark et al. |
| 5,256,496 A | * | 10/1993 | Kluczynski ................. 428/661 |
| 5,298,683 A | * | 3/1994 | Taylor ................. 174/152 GM |
| 5,437,194 A | * | 8/1995 | Lynnworth ............... 73/861.27 |
| 5,473,949 A | * | 12/1995 | Cage et al. .............. 73/861.38 |
| 5,476,013 A | * | 12/1995 | Hussain et al. .......... 73/861.37 |
| 5,598,966 A | | 2/1997 | Romano et al. |
| 5,602,345 A | * | 2/1997 | Wenger et al. ......... 73/861.357 |
| 5,669,825 A | | 9/1997 | Shira |
| 5,803,553 A | * | 9/1998 | Wei ............................ 228/131 |
| 5,827,979 A | | 10/1998 | Schott et al. |
| 6,168,069 B1 | * | 1/2001 | Lorenz ....................... 228/122 |
| 6,183,378 B1 | * | 2/2001 | Shira ....................... 73/861.27 |
| 6,343,511 B1 | * | 2/2002 | Lynnworth et al. ........... 73/644 |
| 6,352,196 B1 | * | 3/2002 | Lorenz ....................... 228/121 |

OTHER PUBLICATIONS

Keller, D.L., McDonald, M.M., Heiple, C.R., Johns, W.L., and Hofmann, W.E., "Wettability of Brazing Filler Metals", Oct. 1990, Welding Journal, vol. 69, No. 10, Miami, Florida, pp. 31–34.

Peaslee, Robert L., "Brazing Q & A", May, 1991, Welding Journal, vol. 70, Nol. 5, Miami, Florida, p. 112.

Humpston et al., Soldering and Brazing, ASM International, pp. 46, 47, and 145 147.

* cited by examiner

USE OF SILVER-COPPER-PALLADIUM BRAZING ALLOYS

This application is a continuation of application Ser. No. 09/618,068 filed Jul. 17, 2000, now U.S. Pat. No. 6,352,196, which is a continuation of application Ser. No. 09/110,606 filed Jul. 6, 1998 now U.S. Pat. No. 6,468,069 which claims priority of of No. 60/056,285 filed Sep. 3, 1997.

FIELD OF THE INVENTION

This invention deals with a novel use of silver-copper-palladium brazing alloys.

BACKGROUND OF THE INVENTION

Such brazing alloys are commercially available, cf. "Welding Journal, October 1990, pages 31 to 34, which describes, among many other brazing alloys whose ability to wet 316L steel is investigated, a 68Ag-27Cu-5Pd brazing alloy designated as "Palcusil 5", a 58Ag-32Cu-10Pd brazing alloy designated as "Palcusil 10", a 65Ag-20Cu-15Pd brazing alloy designated as "Palcusil 15", and a 54Ag-21Cu-25Pd brazing alloy designated as "Palcusil 25".

Since these silver-copper-palladium brazing alloys properly wet stainless steel, they can be used for brazing components made of this material. It is also possible, however, to braze components of titanium with these silver-copper-palladium brazing alloys.

SUMMARY OF THE INVENTION

When examining how to braze a component of titanium to a component of stainless steel, i.e. without first having to apply an intermediate layer of another metal to the steel, for instance nickel to 304L steel, cf. "Welding Journal, May 1991, page 112, the inventor first noted only that, if flat surfaces of the two components are brazed, the joint is brittle after having cooled down.

This is due to the rather different coefficients of thermal expansion of these two materials; the expansion coefficient of steel is quite a bit greater than that of titanium.

Surprisingly, however, silver-copper-palladium brazing alloys, which have hitherto been offered only for the brazing of components of the same material, are also very well suited for brazing titanium to stainless steel if, according to one feature of the invention, the second component, i.e., the component of stainless steel, clasps the first component, i.e., the component of titanium, tightly, so that the cold joint is under constant compressive stress.

Accordingly, a first variant of the invention consists in the use of silver-copper-palladium brazing alloys for brazing a first component of titanium to a second component of stainless steel which clasps the first component tightly.

A second variant of the invention provides a method for forming a compound arrangement by brazing a first component of titanium to a second component of stainless steel which clasps the first component tightly, using silver-copper-palladium brazing alloys, wherein the first component of titanium is provided with a cylindrical first end
which has a smaller outside diameter than an adjacent main portion
whose external surface is, at least in part, a first surface to be brazed;
the second component is a cylindrical steel sleeve
whose inside diameter is equal to the outside diameter of the main portion of the first component and
whose internal surface is, at least in part, a second surface to be brazed;
a silver-copper-palladium brazing alloy is placed around the first end of the first component;
the steel sleeve is slipped over the main portion of the first component; and
the first and second components and the silver-copper-palladium brazing alloy are heated in a vacuum or an inert gas until the silver-copper-palladium brazing alloy melts and wets the surfaces to be brazed, and are then allowed to cool down;
whereby the compound arrangement is formed.

A first development of the second variant of the invention provides a method wherein
the steel sleeve has an end projecting beyond the first end of the first component of titanium;
the first component has a tapped blind hole at the first end;
a tube of stainless steel which has an outside diameter equal to the inside diameter of the steel sleeve is provided at a first end with an external thread fitting the thread of the tapped blind hole; and
the projecting end of the steel sleeve is brazed to the tube.

A second development of the second variant of the invention, which can also be used together with the first development, provides a method wherein the main portion of the first component of titanium is provided with a collar remote from the first end, said collar being covered by and serving as a stop for the steel sleeve.

A third development of the second variant of the invention, which can also be used with the first development and/or the second development, provides a method wherein
the first component of titanium is provided with an axial bore whose diameter is equal to the inside diameter of the tube of stainless steel;
a titanium tube whose outside diameter is virtually equal to the inside diameter of the tube is inserted into the tube and into the axial bore; and
the titanium tube is electrically welded to the first component in an inert-gas atmosphere.

In a preferred embodiment of the first or second variant of the invention, which can also be used with the above developments, a composition of 86.5 wt. % silver, 26.5 wt. % copper, and 5 wt. % palladium is used which is as free of residues as possible.

BRIEF DESCRIPTION OF THE DRAWINGS

The invention will now be explained in more detail with reference to the accompanying drawings, in which embodiments are shown schematically in the form of longitudinal sections, and in which like reference characters have been used to designate like parts. In a figure following a figure in which a reference character appeared for the first time, this reference character is not shown again.

DETAILED DESCRIPTION OF THE INVENTION

Figure 1:
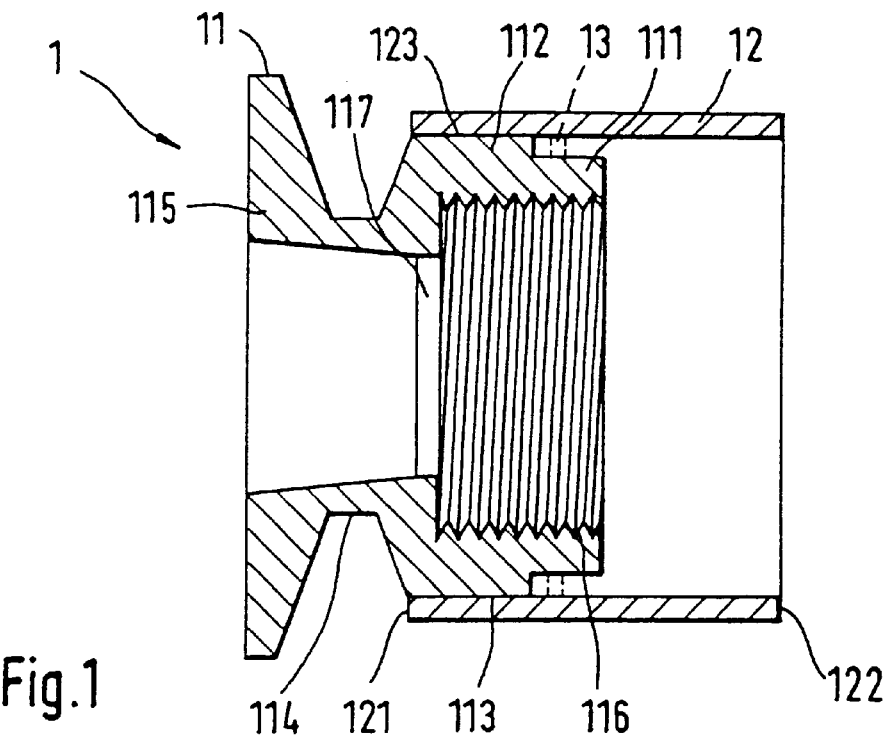
FIG. 1 shows a compound arrangement formed according to the second variant of the invention.

FIG. 1 shows a compound arrangement 1 of a first component 11 of titanium and a second component of stainless steel in a sectional view. According to the second variant of the invention, compound arrangement 1 was formed by brazing with a silver-copper-palladiumbrazing alloy.

For this purpose, component 11 was provided with a cylindrical first end 111 which has a smaller outside diameter than an adjoining main portion 112. The external surface 113 of the latter is, at least in part, a first surface to be brazed; in FIG. 1 this is the entire external surface 113. The main portion is followed, via a constriction 114, by an integral flange 115.

At its end 111, component 11 is provided with a tapped blind hole 116 which extends into main portion 112. From end 111, component 11 was provided with an axial bore 117; its function and the functions of flange 115 and tapped blind hole 116 are explained below.

The second component is a cylindrical steel sleeve 12 whose inside diameter is equal to the outside diameter of main portion 112 of component 11, and whose internal surface 123 is, at least in part, a second surface to be brazed; in FIG. 1, this is the surface touching external surface 113 of component 11.

A first end 121 of steel sleeve 12 terminates at the beginning of constriction 114, while a second end 122 projects beyond the end of component 11. This is by no means mandatory: Steel sleeve 12 may also be flush with or recede from end 111.

To form the compound arrangement, steel sleeve 12 is slipped over main portion 112 of component 11, i.e., the outside diameter of the main portion is slightly less than the inside diameter of the steel sleeve, so that the latter can be easily slipped on. Thus, in this condition, steel sleeve 12 encloses component 11 without clasping it tightly for the time being.

After steel sleeve 12 has been slipped on, a silver-copper-palladium brazing alloy 13 is placed around the first end 111 of component 11, as indicated by broken lines. The amount of brazing alloy 13 is chosen to be sufficient for brazing the two surfaces 113, 123. Brazing alloy 13 may take the form of a prefabricated silver-copper-palladium wire, a corresponding ribbon, or a corresponding paste.

A silver-copper-palladium brazing alloy which has proved especially suitable is a composition of 68.5 wt. % silver, 26.5 wt. % copper, and 5 wt. % palladium which is as free of residues as possible.

The arrangement consisting of component 11, steel sleeve 12, and silver-copper-palladium brazing alloy 13 is then heated in a vacuum or an inert gas, since titanium oxidizes quickly when heated, until the brazing alloy melts and penetrates into the gap between the surfaces to be brazed and wets these surfaces as completely as possible. Then the arrangement is allowed to cool down, so that steel sleeve 12 clasps component 11 tightly. The formation of compound arrangement 11 is thus completed.

Figure 2:
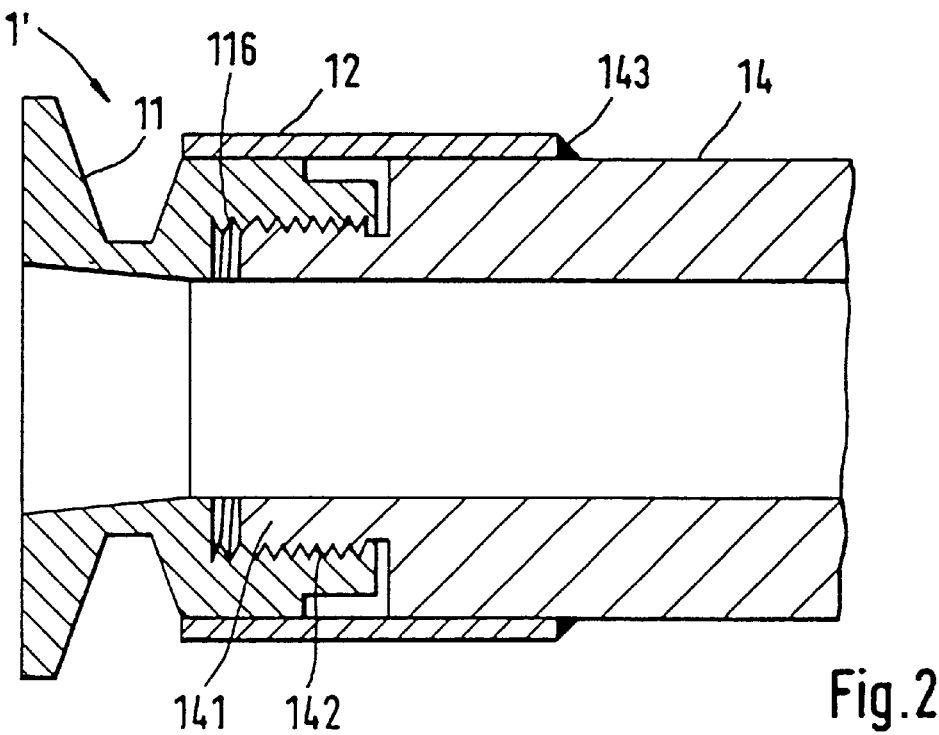
FIG. 2 shows a compound arrangement formed according to the above first development.

FIG. 2 shows a sectional view of a compound arrangement 1' formed according to a development of the method explained with reference to FIG. 1. A tube 14 of stainless steel which was provided at a first end 141 with an external thread 142 fitting the thread 116 of the tapped blind hole was screwed into the blind hole. Tube 14 has an outside diameter equal to the inside diameter of steel sleeve 12. The projecting end 122 of steel sleeve 12 was welded to tube 14, as illustrated by a weld 143.

Figure 3:
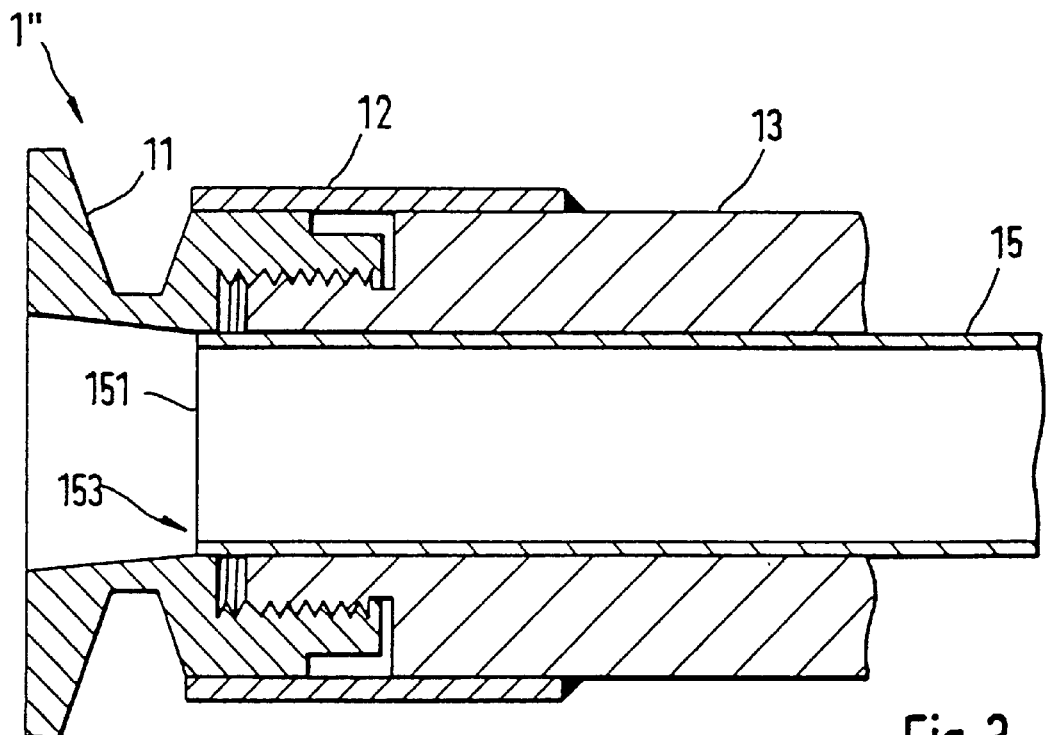
FIG. 3 shows compound arrangement formed according to the above third development.

FIG. 3 shows a sectional view of a compound arrangement 1" formed according to another development of the method explained with reference to FIGS. 1 and 2. A titanium tube 15 whose outside diameter is virtually equal to the inside diameter of tube 13 was inserted into axial bore 117. A first end 151 of titanium tube 15 was electrically welded at 153 to component 11 in an inert-gas atmosphere.

Figure 4:
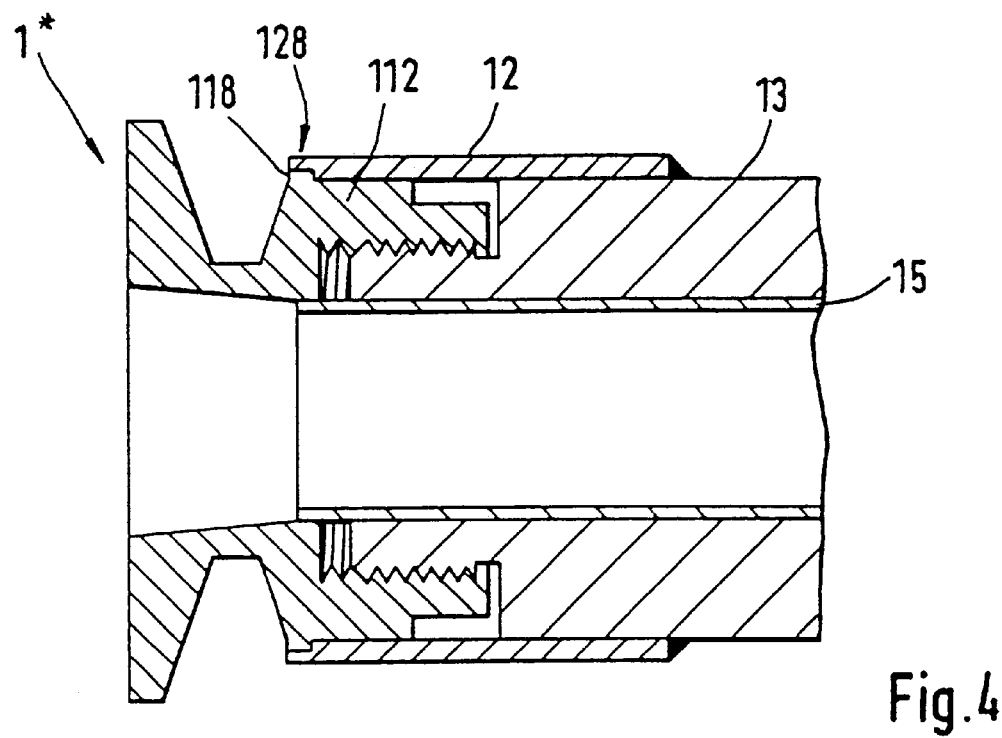
FIG. 4 shows compound arrangement formed according to the above second and third developments.

FIG. 4 shows a cross-sectional view of a compound arrangement 1* formed according to still another development of the method explained with reference to FIGS. 1 to 3. Main portion 112 of component 11 of titanium was provided with a collar 118 remote from first end 111. Collar 118 is covered by steel sleeve 12 and serves as a stop for the latter. To this end, steel sleeve 12 was provided with a recess 128 which fits collar 118.

Figure 5:
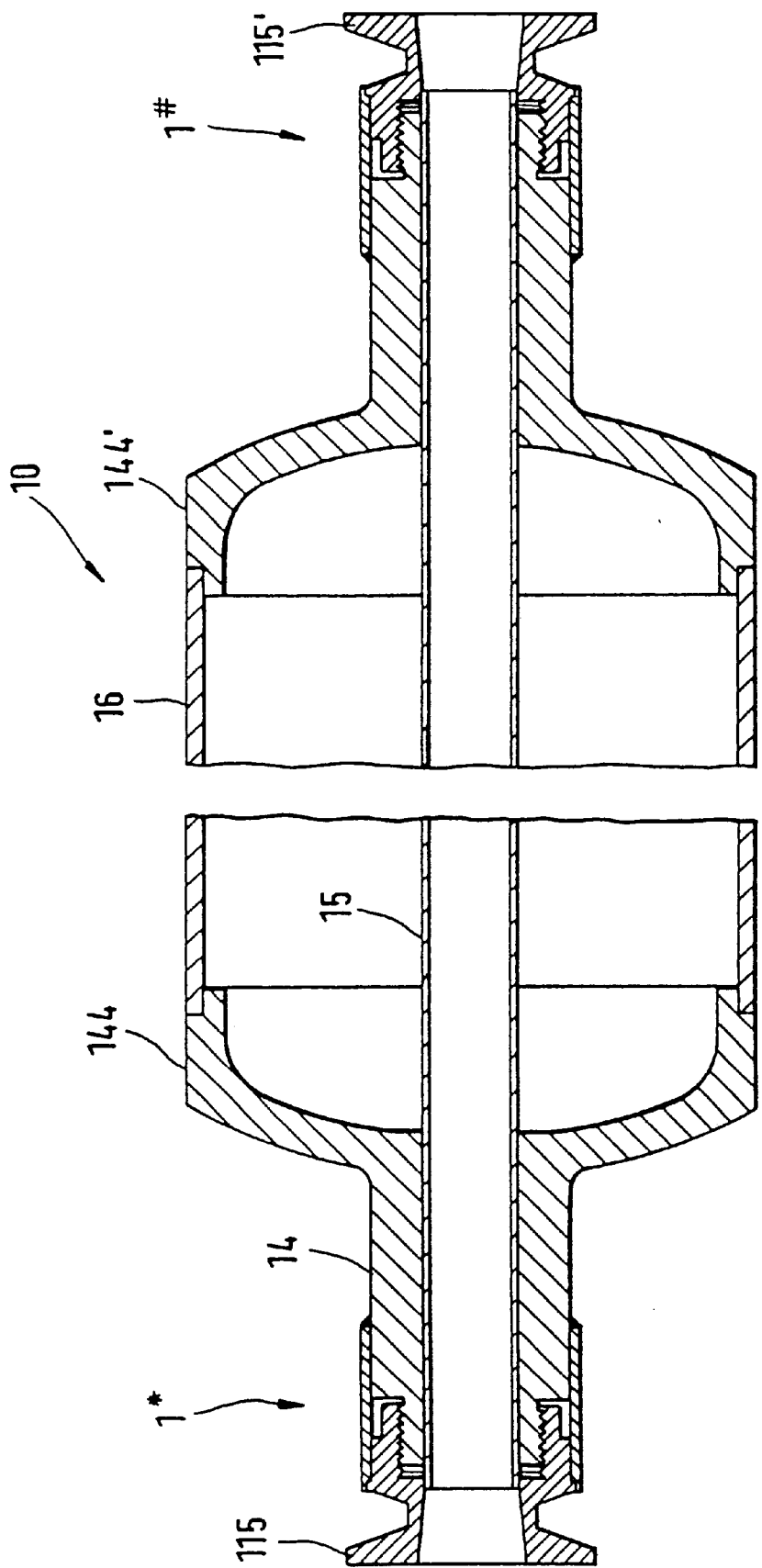
FIG. 5 shows the use of the second variant of the invention in a single-tube Coriolis mass flow sensor.

FIG. 5 shows a cross-sectional view of a single-tube Coriolis mass flow sensor 10 in which the second variant of the invention, shown in FIGS. 1 to 4, was used to advantage twice. Tube 14 of compound arrangement 1* expands into a funnel-like end portion 144 having a greater diameter than tube 14.

A compound arrangement 1# which is symmetrical with respect to compound arrangement 1* has a funnel-like end portion 144'. End portions 144, 144' are permanently connected with one another by a support tube 16, for example by being welded to the support tube all around. For this purpose, end portions 144, 144' are so designed that support tube 16 can be slip-fitted to them and that the external surfaces of end portions 144, 144' are flush with the external surface of support tube 16.

The diameter of end portion 144, which is greater than the diameter of tube 14, is chosen so that the resulting hollow space can serve to mount an exciter assembly and sensors etc. on titanium tube 15. These, as is well known, are necessary for a Coriolis mass flow sensor but have been omitted in FIG. 5 for clarity.

By using the invention with a single-tube Coriolis mass-flow sensor, which, as is usual and as shown in FIG. 5, is provided with titanium tube 15 as a vibrating measuring tube, very good joints can be produced between support tube 16 of stainless steel and flange 115 of titanium and between titanium tube 15 and flange 115.

These joints between titanium and titanium and between titantium and steel are necessary since both the junction between titanium tube 15 and (titanium) flange 115 and the junction between steel tube 14 and (titanium) flange 115 must remain tight under all operating conditions, particularly in case of changes in temperature. This is guaranteed, since the maximum permissible operating temperature of Coriolis mass flow sensor 10 is far below the temperature of the above-explained brazing.

By means of flange 115 and the corresponding flange 115' at compound arrangement 1#, the single-tube Coriolis mass-flow sensor 10 can be installed in a pipe conducting the fluid to be measured fluid-tight.

The invention can be used to particular advantage in a single-tube Coriolis mass flow sensor with a cantilever mass as is described in the prior U.S. Provisional Applications Ser. No. 60/032,906 filed Dec. 16, 1996, and Ser. No. 60/036,192 filed Jan. 21, 1997 as well as the corresponding U.S. Non-Provisional Application Ser. No. 08/940,644 filed Sep. 30, 1997 which are incorporated herein by reference.

What is claimed is:

1. A single-tube Coriolis mass flow sensor, comprising:
   a stainless steel sleeve having an unplated interior surface; and
   a first titanium member having a cylindrical end inserted into the stainless steel sleeve, the exterior surface of the titanium cylindrical end forming a joint with the unplated interior surface of the stainless steel sleeve, the titanium cylindrical end brazed to the unplated interior surface of the stainless steel sleeve at the joint by a silver-copper-pallidium brazing alloy, wherein the stainless steel sleeve exerts compressive stress on the titanium cylindrical end at the joint.

2. The device of claim 1, further comprising a stainless steel tube, the stainless steel tube coupled to the titanium cylindrical end.

3. The device of claim 2, wherein the stainless steel sleeve includes a distal end extending beyond the titanium cylindrical end, the distal end of the stainless steel sleeve welded to the exterior surface of the stainless steel tube.

4. The device of claim 1, wherein the titanium cylindrical end defines an interior threaded aperture.

5. The device of claim 4, further comprising a stainless steel tube, the stainless steel tube having a threaded distal extension, the threaded distal extension of the stainless steel tube engaging the interior threaded aperture of the titanium cylindrical end.

6. The device of claim 5, wherein the stainless steel sleeve includes a distal end extending beyond the titanium cylindrical end, the distal end of the stainless steel sleeve having an interior surface equal to the outer diameter of the stainless steel tube, the distal end of the stainless steel sleeved welded to the exterior surface of the stainless steel tube.

7. The device of claim 2, further comprising a titanium tube, the titanium tube inserted through the stainless steel tube and coupled to the titanium cylindrical end.

8. The device of claim 5, wherein the titanium cylindrical end further defines an axial bore.

9. The device of claim 8, further comprising a titanium tube, the titanium tube inserted through the stainless steel tube and welded to the axial bore of the titanium cylindrical end.

10. The device of claim 9, wherein the outer diameter of the titanium tube is equal to the interior diameter of the stainless steel tube.

11. The device of claim 10, wherein the stainless steel sleeve includes a distal end extending beyond the titanium cylindrical end, the distal end of the stainless steel sleeve having an interior surface equal to the outer diameter of the stainless steel tube, the distal end of the stainless steel sleeved welded to the exterior surface of the stainless steel tube.

12. The device of claim 1, wherein the interior diameter of the stainless steel tube is equal to the outer diameter of the titanium cylindrical end.

13. The device of claim 1, wherein the interior diameter of the stainless steel tube is greater than the outer diameter of the titanium cylindrical end.

14. The device of claim 4, wherein the titanium cylindrical end includes a raised collar along the exterior diameter.

15. The device of claim 14, wherein the stainless steel sleeve includes an interior recess that couples to the raised collar along the exterior diameter of the titanium cylindrical end.

16. A chamber for mounting an exciter assembly in a Coriolis mass flow sensor, comprising:

a stainless steel sleeve having an unplated interior surface;

a first titanium member having a cylindrical end defining an interior threaded aperture and inserted into the stainless steel sleeve, the exterior surface of the titanium cylindrical end forming a joint with the unplated interior surface of the stainless steel sleeve, the titanium cylindrical end brazed to the unplated interior surface of the stainless steel sleeve at the joint, wherein the stainless steel sleeve exerts compressive stress on the titanium cylindrical end at the joint;

a stainless steel tube, the outer diameter of a first end of the stainless steel tube equal to the inner diameter of the stainless steel sleeve, the stainless steel tube having a threaded extension, the threaded extension of the stainless steel tube engaging the interior threaded aperture of the titanium cylindrical end.

17. The chamber of claim 16, further comprising a titanium tube, the titanium tube inserted through the stainless steel tube and coupled to the titanium cylindrical end.

18. The chamber of claim 17, wherein the outer diameter of a second end of the stainless steel tube is greater than the outer diameter of the first end to define a chamber for mounting the exciter assembly.

19. A compound arrangement comprising:

a first component of metal brazed to a second component of metal, said first component having an external surface enclosed by said second component;

wherein the external surface of the first component is coated by a brazing alloy forming a joint between the first and the second component; and wherein the second components clasps the first component tightly, so that the joint is under permanent compressive stress.

20. The compound arrangement as claimed in claim 19 wherein the metal of the first component is titanium.

21. The compound arrangement as claimed in claim 19 wherein the metal of the second component is steel.

22. The compound arrangement as claimed in claim 19 wherein the metal of the second component is stainless steel.

23. The compound arrangement as claimed in claim 19 wherein an ingredient of the brazing alloy is silver.

24. The compound arrangement as claimed in claim 19 wherein an ingredient of the brazing alloy is copper.

25. The compound arrangement as claimed in claim 19 wherein an ingredient of the brazing alloy is palladium.

26. The compound arrangement as claimed in claim 19 wherein the brazing alloy is a composition of silver, copper, and palladium.

27. The compound arrangement as claimed in claim 19 wherein the first component is a measuring tube of a Coriolis mass flow sensor and wherein the second component is a flange of said sensor.

28. The compound arrangement as claimed in claim 19 wherein the first component is a measuring tube of a Coriolis mass flow sensor and wherein the second component is a support of said sensor.

29. The compound arrangement as claimed in claim 19 wherein the first component is a flange of a Coriolis mass flow sensor and wherein the second component is a support tube of said sensor.

30. The compound arrangement as claimed in claim 19 wherein the first component is a support tube of a Coriolis mass flow sensor and wherein the second component is a flange of said sensor.

31. The arrangement of claim 19, wherein the metal of one of the first and the second components is a nonferrous metal.

32. The arrangement of claim 31, wherein the metal of one of the first and the second components includes steel.

33. The arrangement of claim 31, wherein the metal of one of the first and the second components includes titanium.

34. The arrangement of claim 33, wherein the metal of one of the first and the second components includes steel.

35. The arrangement of claim 31 wherein the first component is an oscillating measuring tube of a flow sensor.

36. The arrangement of claim 35, wherein the flow sensor is a mass flow sensor.

37. The arrangement of claim 31, wherein the first component is a measuring tube of a flow sensor and the second component is a flange of the flow sensor.

38. The arrangement of claim 37, wherein the flow sensor is a mass flow sensor.

39. The arrangement of claim 31, wherein the first component is a measuring tube of a Coriolis mass flow sensor and the second component is a support tube of the sensor.

40. The arrangement of claim 31, wherein the first component is a flange of a Coriolis mass flow sensor and the second component is a support tube of the sensor.

41. The arrangement of claim 31, wherein the first component is a support tube of a Coriolis mass flow sensor and the second component is a flange of the sensor.

* * * * *